United States Patent

Hoyt et al.

[11] Patent Number: 6,062,992
[45] Date of Patent: May 16, 2000

[54] BALL MARK REPAIR TOOL

[75] Inventors: David Hoyt; Gary Aldcroft, both of Gardena, Calif.

[73] Assignee: Principle Plastics, Inc., Gardena, Calif.

[21] Appl. No.: 09/097,329

[22] Filed: Jun. 15, 1998

[51] Int. Cl.[7] .............................. A63B 57/00; A01B 1/00
[52] U.S. Cl. ............................................. 473/408; 172/378
[58] Field of Search .................................. 473/408, 286; 294/50.6, 50.7, 50.9, 50.8; 172/371–381

[56] References Cited

U.S. PATENT DOCUMENTS

| | | | |
|---|---|---|---|
| 1,466,168 | 8/1923 | Holton | 294/50.7 |
| 3,168,150 | 2/1965 | Kappler | 172/371 |
| 3,425,732 | 2/1969 | Reich | 294/50.8 |
| 3,567,264 | 3/1971 | Baber | 294/50.7 |
| 4,013,295 | 3/1977 | Baughman | 473/286 |
| 4,884,805 | 12/1989 | Patterson | 473/408 |
| 5,322,130 | 6/1994 | Ryden | 172/378 |
| 5,730,226 | 3/1998 | Kendall | 473/408 |
| 5,778,986 | 7/1998 | Davis | 473/408 |

*Primary Examiner*—Steven Wong
*Attorney, Agent, or Firm*—James E. Brunton

[57] ABSTRACT

An improved ball mark repair tool which can be used to relieve compaction of the earth surrounding the ball mark in a correct manner and then gently force the earth upwardly and inwardly about the ball mark so as to raise the turf and properly fill the indentation. More particularly, in one form of the invention, a downward pressure exerted upon the handle of the device will urge spaced apart earth engaging repair prongs to penetrate the earth in an area surrounding the ball mark and then to automatically move the prongs inwardly relative to one another to loosen the soil and urge it inwardly and upwardly so as to correctly restore the surface of the green to a substantially planar condition.

7 Claims, 3 Drawing Sheets

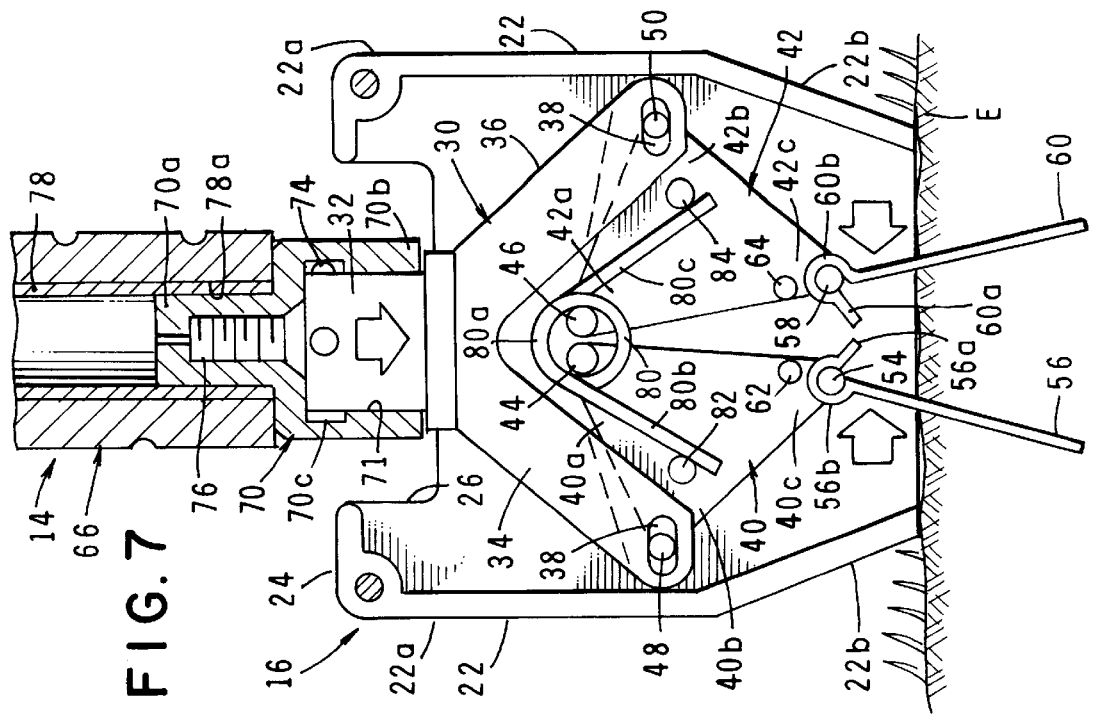
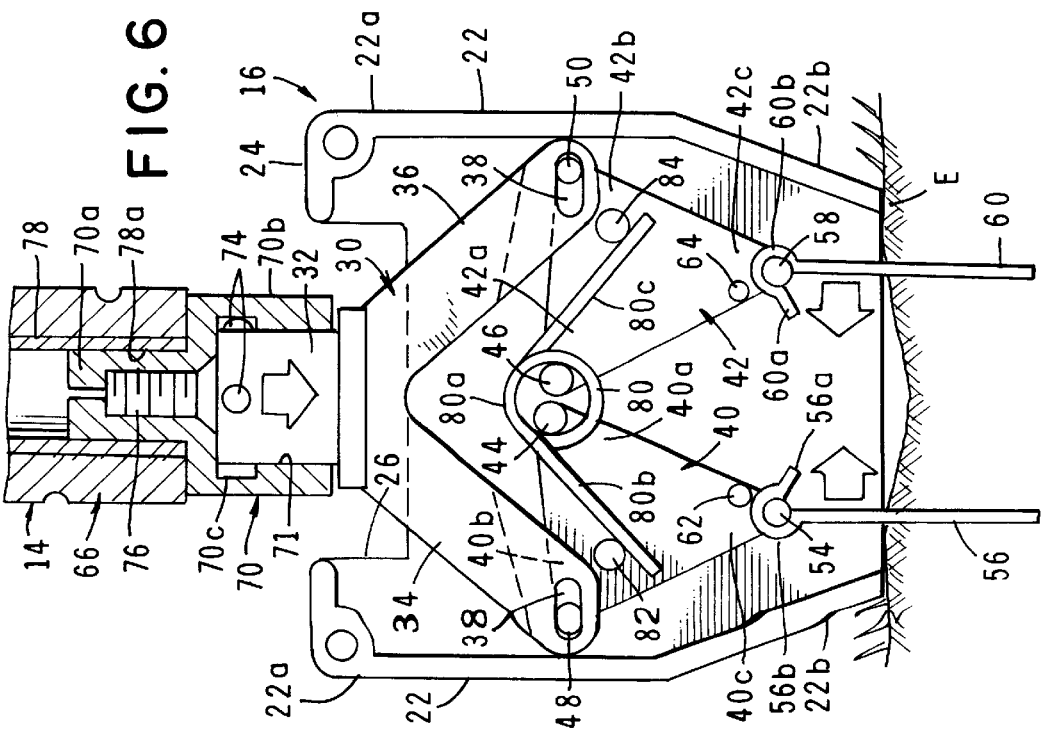

BALL MARK REPAIR TOOL

BACKGROUND OF THE INVENTION

1. Field of the Invention

The present invention relates generally to golf course maintenance tools. More particularly, the invention concerns an implement for removing indentations, called marks, from putting greens by centering the implement over the indentations and then by exerting a downward force on a handle to move downwardly extending prongs into the surface of the turf in a manner to elevate the soil beneath the impression or ball mark.

2. Discussion of the Prior Art

Golf courses and particularly golf course greens require continuous maintenance in order to maintain the course in good playing condition. More particularly, it is essential to the game that the putting green surface be continually maintained so that it is substantially free of irregularities which would potentially affect the rolling of a golf ball directed toward the putting cup.

Irregularities in the putting green typically arise when the golf ball impacts the surface of the putting green causing the semi-spherical indentations in the surface of the putting green. These indentations, which are typically referred to as ball marks, if not repaired, become a substantial nuisance and detraction to the players. Additionally, the repair of the ball marks if not properly done, can damage the green and further impair the roll of the golf ball along the surface of the green.

Because of the importance of maintaining the golf course in good condition, most golf courses, be they public or private, place considerable emphasis on requiring golfers using the course to conscientiously maintain the course in good playing condition by repairing the ball marks made by their ball each time the ball impacts the golf course green. To accomplish this necessary ball mark repair, many golfers carry in their pocket a small, pronged tool for lifting up the compacted turf and underlying soil so that the ball mark, or indentation can be worked up and then leveled, as for example, by tamping the repaired area with the head of the putter.

In addition to the aforementioned type of ball mark repair tool, a number of other types of more elaborate ball mark repair devices have been suggested in the past. One such device is disclosed in U.S. Pat. No. 3,567,264 issued to Baber. The Baber device includes a central support rod, a spider mounted about the lower extremity of the support rod, and six angular blades pivotally connected to the spider. Pushing down on the central rod of the Barber device causes the six angular blades to move downwardly and inwardly through the surface of the turf in a manner to converge about the indentation or ball mark. The coaction of the blades as they converge about the indentation relieves the compaction of the earth, realigning the grass and the grass roots and force the earth upwardly and inwardly in a manner to raise the turf and fill the indentation.

Another ball mark repair device is disclosed in U.S. Pat. No. 4,846,286 issued to McNeely et.al. The McNeely apparatus includes a pair of turf gripping elements for removing patches of turf and soil for fixing or filling in ball mark indentations on a golf green. The apparatus is manually actuated through a linkage lever mechanism which functions to remove turf green elements during the ball mark repair operation.

The O'Sullivan ball mark repair device disclosed in U.S. Pat. No. 5,398,927 comprises a ball mark repair tool which is permanently affixed to the bottom of a flag pin and replaces a standard furrow usually provided thereon. A plunging motion is employed by the user of the O'Sullivan ball mark repair tool to cause the turf engaging elements of the tool to contact the turf in the area of the ball mark. More particularly, an outer cylindrical sleeve first contacts the turf and is followed by a blade which is rotated and thrust downwardly by an internal mechanism. The action of the ball mark repair tool causes the turf and the underlying soil of the ball mark area to be loosened thus promoting the recovery of the ball mark area.

While many of the prior art ball mark repair devices perform in a satisfactory manner, certain of the devices tend to be mechanically quite complex making them somewhat difficult to operate and often expensive to manufacture. The thrust of the present invention is to overcome the drawbacks of the prior art ball mark repair devices by providing a novel ball mark repair tool which is of an elegantly simple construction and yet one that is easy to use, inexpensive to manufacture and yet functions in a proper manner to quickly and effortlessly correctly repair ball marks.

SUMMARY OF THE INVENTION

It is an object of the present invention to provide an improved ball mark repair tool which can be used to relieve compaction of the earth surrounding the ball mark in a correct manner and then gently force the earth upwardly and inwardly about the ball mark so as to raise the turf and properly fill the indentation.

Another object of the invention is to provide a ball mark repair tool of the aforementioned character which can be readily used by either the golfer or relatively unskilled laborers to efficiently and properly remove ball marks from the golf green.

Another object of the invention is to provide a ball mark repair tool of the character described in the preceding paragraphs in which a downward pressure exerted upon the handle of the device will urge spaced apart earth engaging repair prongs to penetrate the earth in an area surrounding the ball mark and then to automatically move the prongs inwardly relative to one another to loosen the soil and urge it inwardly in a manner to gently loosen the soil and urge it inwardly and upwardly so as to correctly restore the surface of the green to a substantially planar condition.

Another object of the invention is to provide a ball mark repair tool of the class described which is of simple construction, embodies a minimum number of moving parts and is highly durable and reliable in operation.

Another object of the invention is to provide a ball mark repair tool which is compact, lightweight and easy to store and transport.

Another object of the invention is to provide a ball mark repair tool which includes a novel operating mechanism that can be easily affixed to the upper end of a putter handle.

Another object of the invention is to provide a ball mark repair tool of the character described in the preceding paragraphs which can be inexpensively manufactured in quantity.

BRIEF DESCRIPTION OF THE DRAWINGS

FIG. 6 is a side-elevational view similar FIG. 5, further illustrating the relative movement of the component parts of the device as the handle is urged further downwardly relative to the device housing.

FIG. 7 is cross-sectional view similar to FIG. 6, illustrating further movement of the component parts of the apparatus as the handle of the device is moved downwardly toward its lower most position.

DESCRIPTION OF THE INVENTION

Figure 1:
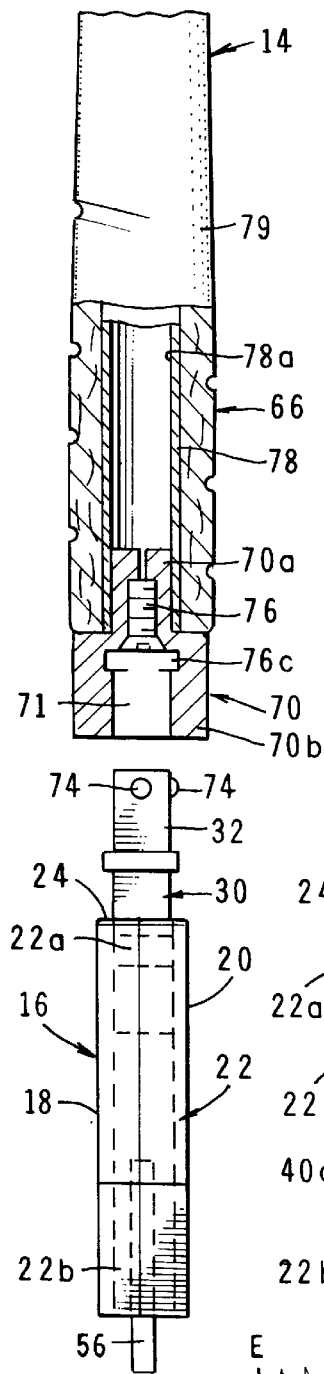
FIG. 1 is a side-elevational view of one form of the ball mark repair tool of the present invention partially broken away to show internal construction.
Figure 2:
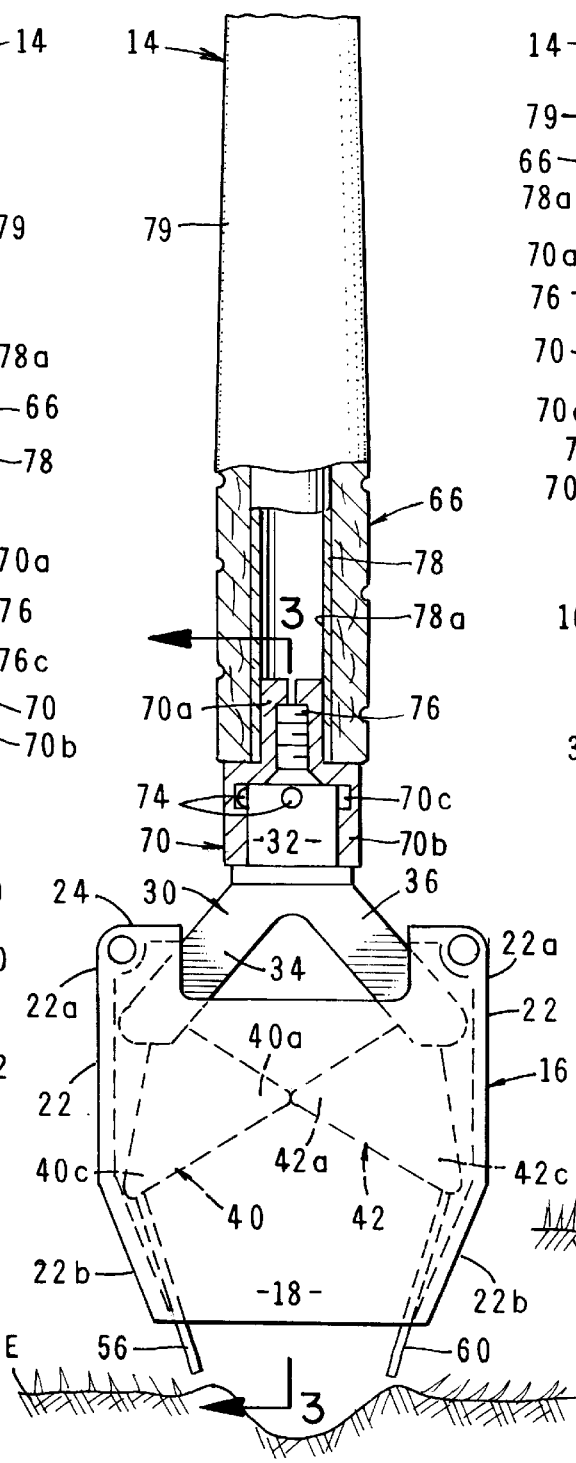
FIG. 2 is a front view of the apparatus shown in FIG. 1.
Figure 3:
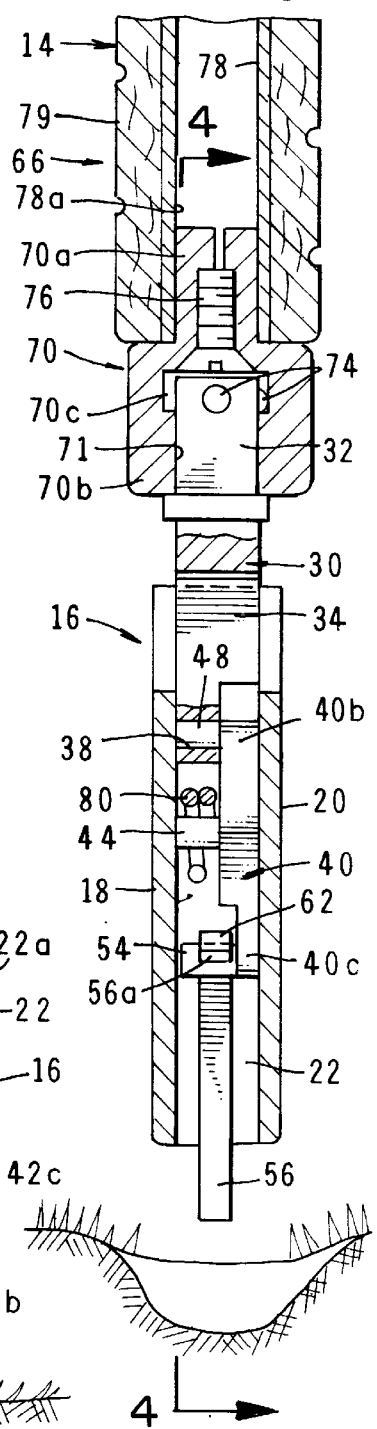
FIG. 3 is a enlarged cross-sectional view taken along lines 3—3 of FIG. 2.
Figure 4:
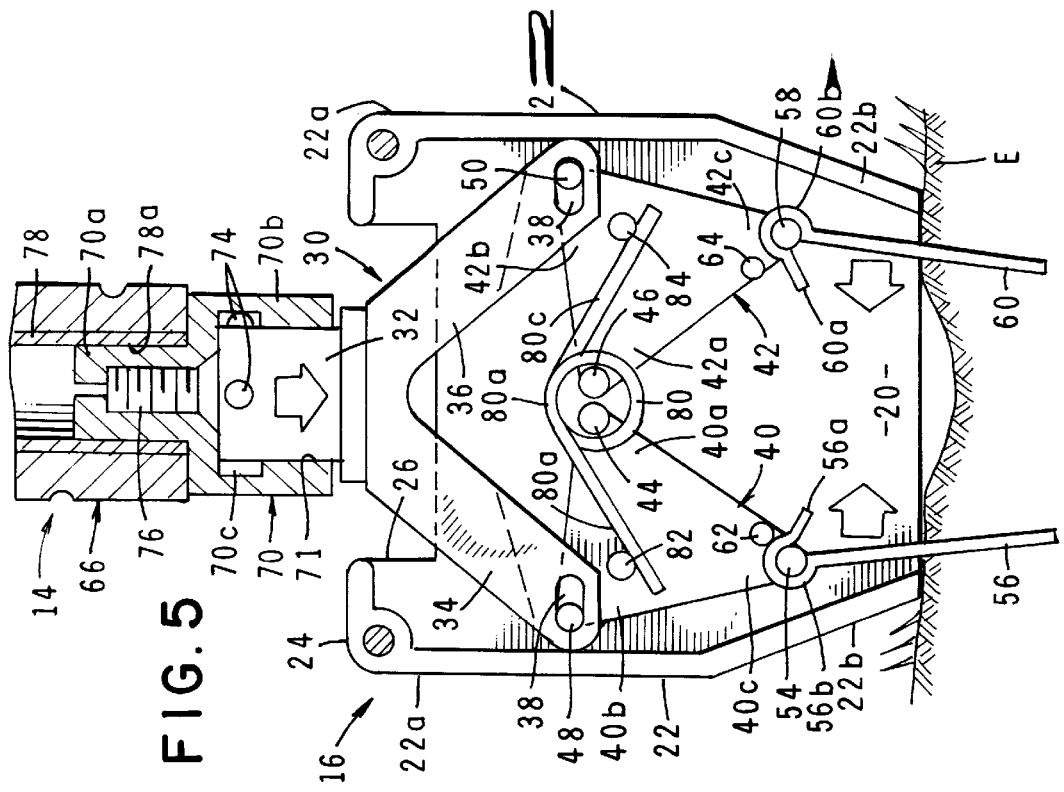
FIG. 4 is a cross-sectional view taken along lines 4—4 of FIG. 3.

Referring to the drawings and in particular to FIGS. 1, 2, and 3, one form of the ball mark repair tool of the present invention is illustrated and generally designated by the numeral 14. In this form of the invention, the ball mark repair tool comprises a housing 16, having interconnected front, back and side walls 18, 20 and 22 respectively. As best seen in FIG. 4, each side wall 22 has an upper portion 22a and an angularly inwardly extending lower portion 22b. Housing 16 also includes an upper wall 24 which is provided with a transversely extending opening 26 (FIG. 4). Receivable within housing 16 and movable from a first upper position to a second intermediate position and then to a third lower position is a fork-like member 30 (FIGS. 4 through 7). Fork-like member 30 includes an upper body portion 32, and first and second angularly outwardly extending legs 34 and 36. For a reason presently to be described, each of the legs 34 and 36 is provided with a transverse guide slot 38 which is formed proximate the lower ends of the legs 34 and 36.

Disposed within housing 16 are first and second generally triangular shaped actuating members 40 and 42 (FIG. 4). First actuating member 40 includes first, second and third angularly shaped extremities 40a, 40b and 40c respectively. Similarly, second actuating member 42 has angularly shaped first, second and third extremities 42a, 42b and 42c respectively, each having a connection point, the character of which is described as follows. Provided on angular shaped extremity 40a of the actuating member 40 is an outwardly extending spring engaging pin 44 (FIG. 3). In a similar fashion, an outwardly extending spring engaging pin 46 is provided on angular shaped extremity 42a of actuating member 42. The purpose of these spring engaging pins will presently be described.

Figure 5:
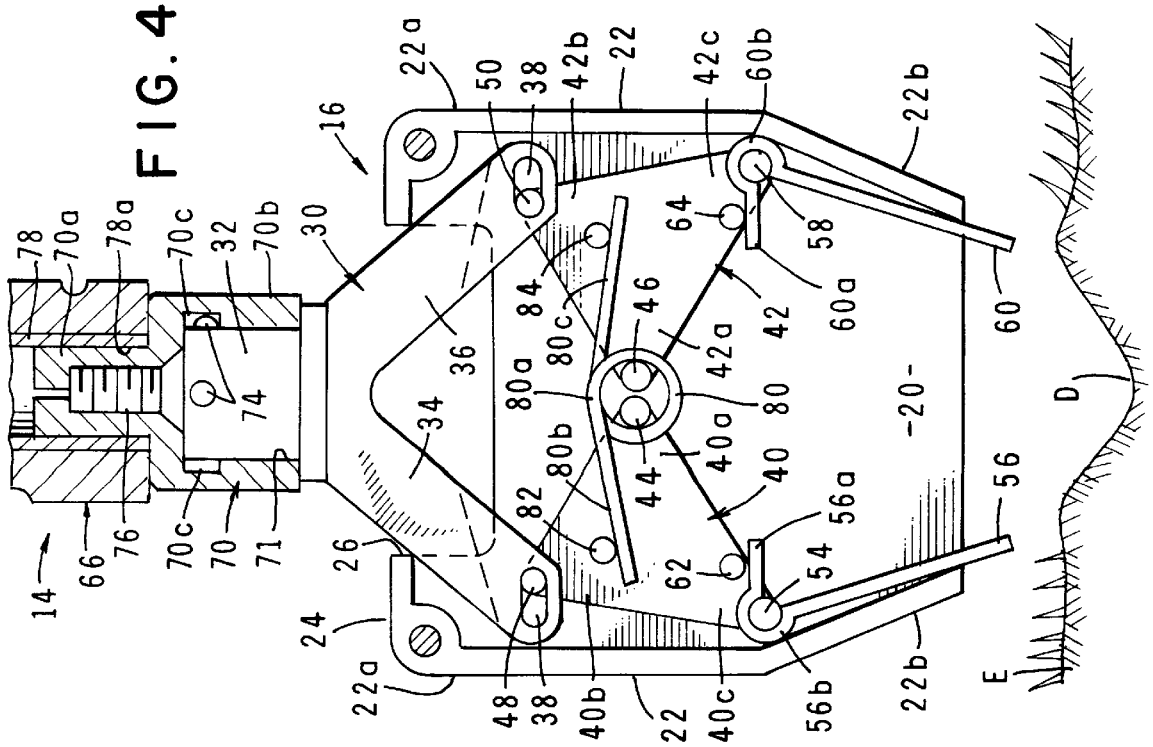
FIG. 5 is a cross-sectional view similar to FIG. 4 but illustrating the relative movement of the various operating components of the device as a downward force is exerted on the handle of the device.

Provided on upper angular shaped extremity 40b of actuating member 40 is a pivot pin 48 which is slidably received within guide slot 38 provided on leg 34 of fork-like member 30. In similar fashion, a pivot pin 50 is provided on upper angular shaped extremity 42b of actuating member 42. Pivot pin 50 is slidably received within slot 38 of leg 36 of fork-like member 30 in a manner illustrated in FIGS. 4 and 5. With the construction thus described and as illustrated in FIGS. 5, 6 and 7, actuating members 40 and 42 are each movable by fork-like member 30 from a first position to a second intermediate position and finally to a third position as member 30 is moved downwardly within housing 16 from its first upper position to its second intermediate position and finally to its third lower position.

Provided on lower angular shaped extremity 40c of actuating member 40 is a first connector pin 54 to which a first ground engaging prong 56 is pivotally interconnected. In similar fashion, a second connector pin 58 is provided on angular shaped extremity 42c of actuating member 42 which functions to pivotally support a second ground engaging prong 60. It is to be noted that both of the ground engaging prongs 56 and 60, include an inwardly extending finger. More particularly, prong 56 includes a finger 56a which prong 60 includes a finger 60a. When the device is assembly in the manner shown in FIGS. 3 and 4, finger 56a engages a pin means, shown here as a pin 62 which is connected to first actuating member 40 and extends outwardly therefrom. In a manner presently to be described, pin 62 functions to resist pivotal movement of ground engaging prong 56 in a first upwardly direction. In similar fashion outwardly extending finger 60a of prong 60 engages pin means shown here as a pin 64 which is connected to actuating member 42. Pin 64 functions to resist pivotal movement of ground engaging prong 60 in a first upwardly direction.

Turning once again to FIGS. 1, 2, and 3, it is to be noted that handle connecting means are provided for releasable interconnecting body portions 32 of fork-like member 30 with an elongated handle 66. This handle connecting means here comprises a connector member 70 which includes a split shank portion 70a and a cup-like portion 70b. Cup-like portion 70b includes a central cavity 71 which is constructed and arranged to telescopically receive the upper portion 32 of fork-like member 30 in the manner shown in FIG. 2. To releasably lock body portion 32 of the fork-like member to connector member 70, a conventional spring biased, detent mechanism, generally designated by the numeral 74, is provided on body portion 32 of the fork-like member. This detent mechanism 74 is receivable within a generally circular grove 70c provided internally of cup-like portion 70b of connector 70. As indicated in FIGS. 2 and 3, shank portion 70a of member 70 is slitted and internally threaded to receive a threaded connector 76 which, when threaded into slitted shank portion 70a, tends to expand the shank portion outward and into secure gripping engagement with the internal wall 78a of a tubular insert 78 which forms a part of handle 66. With this construction, the connecting means or connector 70 can be releasably interconnected with handle 66 by first inserting shank portion 70a into the open end of tubular insert 78 of handle 66 and then by tightening threaded screw 76 so as to expand slitted shank portion 70a outwardly and into pressural engagement with the inner surface of tubular insert 78 of handle 66. With connector member 70 thusly interconnected with handle 66, body portion 32 of the repair tool can be interconnected with connector member 70 by telescopically inserting body portion 32 into central bore 71 to a position where detent 74 snaps into locking engagement with groove 70c.

While handle 66 can take several forms, it is shown here as comprising the gripping handle portion of a conventional putter of the character having an inner sleeve-like structural member such as identified by the numeral 78 in FIG. 1 and an outer grip portion 79. Typically, the putter handle is provided with a cap-like cover which closes the upper open end of tubular member 78. However, when this cover is removed it will expose the open end of member 78 so that the slitted shank 70a of connector member 70 can be interconnected with the putter handle in the manner described in the preceding paragraphs. It is to be understood that the handle portion of the apparatus can comprise a modified putter grip or alternatively can be specially constructed for use with housing 16.

With the apparatus of the invention assembled in the manner shown in FIG. 2, a downward force exerted on handle 66 will cause fork-like member 30 to move from its first starting position shown in FIG. 4 to the second intermediate location shown in FIG. 6, and finally into the third location shown in FIG. 7. As illustrated in FIGS. 4 and 5, as fork-like member 30 moves downwardly within housing 16, the upper semicircular cam member portions 56b and 60b of the ground engaging prongs will engage and slide along the inner walls of the inwardly sloping portions 22b of side walls 22. As the lower extremities penetrate the Earth "E" in the manner shown in FIG. 5, legs 56a and 60a will move away from pins 62 and 64 and actuating members 40 and 42 will move into the rotated position shown in FIG. 5. Resisting this movement is the biasing means of the invention which is here provided in the form of a torsion spring 80 which has a central portion 80a and first and second outwardly extending legs 80b and 80c respectively. As indicated in FIG. 4, 5, 6, and 7, central portion 80a of torsion spring 80 circumscribes pins 44 and 46 and is held in position by these pins. With the central portion of the spring surrounding pins 44 and 46, leg 80b of the torsion spring engages a pin 82 provided on actuating member 40 and leg 80c of the torsion spring engages a pin 84 provided on actuating member 42. With this construction, legs 80b and 80c of the torsion spring act upon pins 82 and 84 in a manner to resist the pivotal or rotating movement of actuating members 40 and 42 from the position shown in FIG. 4 to the position shown in FIG. 5.

A continued downward movement of yoke-like member 30 within housing 16 to the position shown in FIG. 7 will cause further pivotal movement of actuating members 40 and 42 against the urging of biasing means or torsion spring 80. As actuating members 40 and 42 move into the final position shown in FIG. 7, ground engaging prongs 56 and 60 will pivot about pins 54 and 58 in the direction of the arrows in FIG. 7. It is important to note that the construction of the tool of the invention is such that ground engaging prongs 56 and 60 penetrate the earth on either side of the ball mark "D". Then, as illustrated in FIGS. 5, 6, and 7, the pivotal movement of actuating members 40 and 42 will act upon the ground engaging prongs in a manner to gently elevate the soil beneath the ball mark "D" from the depressed configuration shown in FIG. 4 to the less depressed configuration shown in FIG. 5, to the still less depressed configuration shown in FIG. 6 and finally to the almost level configuration of the soil shown in FIG. 7. This strategically designed pivotal movement of the ground engaging prongs as illustrated in the drawings works upon the turf in the correct manner to repair the ball mark without causing undo damage to the surface of the green or the turf being repaired.

It is also to be observed that legs 56a and 60a of the ground engaging prongs engage pins 62 and 64 in a manner to permit pivotal movement of the ground engaging prongs from the position shown in FIG. 4 to the position shown in FIG. 5, but function to resist pivotal movement of the ground engaging prongs in the opposite direction. This unique feature of the apparatus of the invention guarantees that the ground engaging prongs will enter the soil at a correct angle with respect to the ball mark "D" which is being repaired.

After the ball mark has been automatically repaired in the manner shown in FIGS. 4 through 7, an upward force exerted on handle 66, will cause the biasing means or torsion spring 80 to act on pins 82 in a manner to return actuating members 40 and 42 to their original starting position as shown in FIG. 4 wherein the tool is ready for use in the repair of another ball mark in accordance with the procedure described in the preceding paragraphs.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

We claim:
1. A ball mark repair tool comprising:
    (a) a housing having side walls, each said side wall having an upper portion and an angularly inwardly extending lower portion
    (b) a fork-like member receivable within said housing, said fork-like member having a body portion and first and second angularly, outwardly extending legs connected to said body portion, each said outwardly extending leg having a guide slot formed therein, said fork-like member being movable within said housing from a first location to a second location;
    (c) a first actuating member disposed within said housing, said first actuating member having first, second and third connection points, one of said first, second and third connection points being connected to said first leg of said fork-like member, said first connection point comprising a pin extending from said first actuating member, said first actuating member being movable from a first position to a second position upon movement of said fork-like member toward said second location;
    (d) a second actuating member disposed within said housing, said second actuating member having first, second and third connection points, one of said first, second and third connection points being connected to said second leg of said fork member, said first connection point comprising a pin extending from said second actuating member, said second actuating member being movable from a first position to a second position upon movement of said second actuating member toward said second location;
    (e) a first ground engaging prong pivotally connected to one of said first, second and third connection points of said first actuating member and extending downwardly therefrom;
    (f) a second ground engaging prong pivotally connected to one of said first, second and third connection points of said second actuating member and extending downwardly therefrom; and
    (g) biasing means operably interconnected with said first and second actuating members proximate one of said first, second and third connection points thereof for yieldably resisting movement of said first and second actuating member toward said second position, said biasing means comprising a torsion spring having a central portion circumscribing said pins.
2. A tool as defined in claim 1 in which said second connection point of said first actuating member comprises a pin extending from said first actuating member, said pin being slidably receivable within said guide slot formed in said first leg of said fork-like member and in which said second connection point of said second actuating member comprises a pin slidably receivable within said guide slot formed in said second leg of said fork-like member.
3. A tool as defined in claim 2 in which said biasing torsion spring further includes first and second outwardly extending legs, said first leg being operably connected to said first actuating member and said second leg being operably connect to said second actuating member.
4. A tool as defined in claim 3 in which said first actuating member further includes pin means for resisting pivotal movement of said first ground engaging prong and in which said second actuating member further includes pin means for resisting pivotal movement of said second ground engaging prong.

5. A ball mark repair tool comprising:

(a) a handle;

(b) a fork-like member connected to said handle, said fork-like member having a body portion and first and second angularly outwardly extending legs connected to said body portion, each of said outwardly extending legs having a guide slot formed therein, said fork-like member being movable by said handle from a first location to a second location;

(c) a housing encapsulating said fork-like member, said housing having spaced apart side walls, each said side wall having an upper portion and an angularly inwardly extending lower portion;

(d) a first generally triangular shaped actuating member disposed within said housing, said member having first, second and third angular shaped extremities, said first extremity being provided with a spring engaging pin and said second extremity being pivotally connected to said second leg of said fork-like member, said first actuating member being movable from a first position to a second position upon movement of said fork-like member by said handle toward said second location;

(e) a second generally triangular shaped actuating member having first, second and third angularly shaped extremities, said first extremity being provided with a spring engaging pin and said second extremity being pivotally connected to said second leg of said fork member, said second actuating member being movable by said handle from a first position to a second position upon movement of said fork-like member to said second position;

(f) a first ground engaging prong pivotally connected to said third angular shaped extremity of said first actuating member and extending downwardly therefrom;

(g) a second ground engaging prong pivotally connected to said third angular shaped extremity of said second actuating member and extending downwardly therefrom; and (h) biasing means operably interconnected with said first and second actuating members for yieldably resisting movement thereof toward said second position, said biasing means comprising a torsion spring having first and second outwardly extending legs, said first leg being operably connected with said first actuating member and said second leg being operably connected with said second actuating members.

6. A tool as defined in claim 5 in which said first actuating member further includes pin means for resisting pivotal movement of said first ground engaging prong and in which said second actuating member further includes pin means for resisting pivotal movement of said second ground engaging prong.

7. A ball mark repair tool comprising:

(a) a housing having interconnected front, back and sidewalls, each said side wall having an upper portion and an angularly inwardly extending lower portion (b) a fork-like member receivable within said housing, said fork-like member having a body portion and first and second angularly, outwardly extending legs connected to said body portion, each said outwardly extending leg having a guide slot formed therein, said fork-like member being movable within said housing from a first location to a second location;

(c) a first generally triangular shaped actuating member disposed within said housing, said first member having first, second and third angular shaped extremities, said first extremity being provided with a spring engaging pin and said second extremity being pivotally connected to said second leg of said fork-like member, said first actuating member being movable from a first position to a second position upon movement of said fork-like member toward said second location;

(d) a second generally triangular shaped actuating member disposed within said housing, said member having first, second and third angularly shaped extremities, said first extremity being provided with a spring engaging pin and said second extremity being pivotally connected to said second leg of said fork member, said second actuating member being movable from a first position to a second position upon movement of said fork-like member to said second position;

(e) a first ground engaging prong pivotally connected to said third angularly shaped extremity of said first actuating member and extending downwardly therefrom;

(f) a second ground engaging prong pivotally connected to said third angularly shaped extremity of said second actuating member and extending downwardly therefrom; and (g) biasing means operably interconnected with said first and second actuating members for yieldably resisting movement thereof toward said second position, said biasing means comprising a torsion spring having first and second outwardly extending legs, said first leg being operably connected with said first actuating member and said second leg being operably connected with said second actuating members.

* * * * *